United States Patent
Duval et al.

(10) Patent No.: US 10,257,575 B2
(45) Date of Patent: Apr. 9, 2019

(54) HYBRID ELECTRONIC PROGRAM GUIDE

(71) Applicant: NagraStar, LLC, Englewood, CO (US)

(72) Inventors: Gregory Duval, Englewood, CO (US); Christopher Boyd Tirpak, Monument, CO (US); Steven Michael Casagrande, Castle Pines, CO (US)

(73) Assignee: NagraStar, LLC, Englewood, CO (US)

( * ) Notice: Subject to any disclaimer, the term of this patent is extended or adjusted under 35 U.S.C. 154(b) by 0 days.

(21) Appl. No.: 14/818,860

(22) Filed: Aug. 5, 2015

(65) Prior Publication Data

US 2017/0041669 A1    Feb. 9, 2017

(51) Int. Cl.
| | |
|---|---|
| H04N 7/16 | (2011.01) |
| H04N 21/462 | (2011.01) |
| H04N 21/418 | (2011.01) |
| H04N 21/431 | (2011.01) |
| H04N 21/434 | (2011.01) |
| H04N 21/442 | (2011.01) |
| H04N 21/454 | (2011.01) |
| H04N 21/482 | (2011.01) |
| H04N 21/61 | (2011.01) |

(Continued)

(52) U.S. Cl.
CPC ..... *H04N 21/4622* (2013.01); *H04N 21/4181* (2013.01); *H04N 21/435* (2013.01); *H04N 21/4312* (2013.01); *H04N 21/4345* (2013.01); *H04N 21/44209* (2013.01); *H04N 21/454* (2013.01); *H04N 21/4586* (2013.01); *H04N 21/4821* (2013.01); *H04N 21/6125* (2013.01); *H04N 21/6143* (2013.01); *H04N 21/854* (2013.01); *H04N 21/2541* (2013.01)

(58) Field of Classification Search
CPC ... H04N 21/462; H04N 21/4622; H04N 21/82
See application file for complete search history.

(56) References Cited

U.S. PATENT DOCUMENTS 7,444,661 B1 * 10/2008 Wugofski ........... H04L 12/2812
725/49
2001/0039584 A1 * 11/2001 Nobakht ........... G06F 17/30884
709/227

(Continued)

FOREIGN PATENT DOCUMENTS

JP          2014036419        2/2014

OTHER PUBLICATIONS

European Extended Search Report in Application 16182490.9, dated Dec. 14, 2016, 12 pages.

(Continued)

*Primary Examiner* — Pankaj Kumar
*Assistant Examiner* — Timothy R Newlin (57) ABSTRACT

The various examples described herein generally provide systems and methods for generating a hybrid electronic programming guide (EPG) that includes both broadcast content and other types of content, such as over-the-top (OTT) content. In examples, broadcast content may be content provided by a satellite, terrestrial, or cable television provider. Other types of content, e.g., the OTT content, may be content that is delivered over an open network, such as the Internet. In examples, a secure processor may be employed to determine if a subscriber is authorized to access the OTT content based on subscription information received via a broadcast transmission.

20 Claims, 7 Drawing Sheets

(51) Int. Cl.
*H04N 21/435* (2011.01)
*H04N 21/458* (2011.01)
*H04N 21/854* (2011.01)
*H04N 21/254* (2011.01)

(56) References Cited

U.S. PATENT DOCUMENTS

| | | | | |
|---|---|---|---|---|
| 2001/0054112 | A1* | 12/2001 | Nobakht | G06F 17/30884 709/245 |
| 2005/0003840 | A1* | 1/2005 | Nakano | H04N 7/17318 455/466 |
| 2008/0313671 | A1* | 12/2008 | Batrouny | H04H 60/43 725/40 |
| 2009/0044247 | A1* | 2/2009 | Shibahara | H04N 5/4401 725/152 |
| 2009/0150924 | A1* | 6/2009 | Xu | H04N 7/163 725/31 |
| 2009/0249418 | A1* | 10/2009 | Alastruey Gracia | H04N 7/17318 725/114 |
| 2010/0138873 | A1* | 6/2010 | Terada | H04N 5/44543 725/56 |
| 2010/0263010 | A1* | 10/2010 | Kim | H04N 5/50 725/110 |
| 2012/0210386 | A1* | 8/2012 | Kim | H04N 21/4788 725/148 |
| 2013/0055313 | A1* | 2/2013 | Eyer | H04N 21/482 725/49 |
| 2013/0205340 | A1* | 8/2013 | Stahl | G06Q 20/123 725/39 |
| 2013/0263177 | A1* | 10/2013 | McCoy | H04N 21/254 725/32 |
| 2014/0109128 | A1* | 4/2014 | Lee | H04N 21/4345 725/25 |
| 2014/0201797 | A1* | 7/2014 | Kim | H04N 21/26241 725/116 |
| 2014/0289776 | A1* | 9/2014 | Kang | H04N 7/015 725/48 |
| 2014/0373067 | A1* | 12/2014 | Tokikura | H04H 60/25 725/50 |
| 2015/0007235 | A1* | 1/2015 | Lewis | H04N 21/4622 725/56 |
| 2015/0074725 | A1 | 3/2015 | Hale et al. | |
| 2015/0312636 | A1* | 10/2015 | Demerchant | H04N 21/4345 725/47 |
| 2017/0180765 | A1* | 6/2017 | Jennings | H04N 21/23424 |

OTHER PUBLICATIONS

European Summons in Application 16182490.09, dated Apr. 3, 2018, 9 pages.

* cited by examiner

HYBRID ELECTRONIC PROGRAM GUIDE

BACKGROUND

Content is distributed in many different ways. For example, content can be transmitted via a broadcast network, such as via a satellite transmission, a terrestrial broadcast, or content provided by a cable television provider. Content can also be distributed directly to a device via a network, such as the Internet. It is with respect to this general environment that examples of the present invention have been contemplated.

SUMMARY

The various examples described herein generally provide systems and methods for generating a hybrid electronic programming guide (EPG) that includes both broadcast content and other types of content, such as over-the-top (OTT) content. In examples, broadcast content may be content provided by a satellite, terrestrial, or cable television provider. Other types of content, e.g., the OTT content, may be content that is delivered over an open network, such as the Internet.

In examples, a secure processor may be employed to determine whether or not a subscriber has access to both the broadcast content and the OTT content. The service information may be received in a control packet delivered via a broadcast transmission. In further examples, if a particular subscriber's subscription includes the OTT content, further determinations may be made to determine whether the OTT content should be added to the hybrid EPG. For example, because the OTT content is accessible via a network connection, a determination may be made as to whether a connection to the network exists prior to adding the OTT channel to the hybrid EPG.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

The same number represents the same element or same type of element in all drawings.

DETAILED DESCRIPTION

The various examples described herein generally provide systems and methods for generating a hybrid electronic programming guide (EPG) that includes both broadcast content and other types of content, such as over-the-top (OTT) content. In examples, broadcast content may be content provided by a satellite, terrestrial, or cable television provider. Broadcast content may be delivered via a satellite or terrestrial transmission or via a cable network. In other examples, broadcast content may be any type of content delivered via a closed network. The OTT content, for example, may be content that is delivered over an open network, such as the Internet. Providing additional broadcast content, such as adding a new broadcast channel, is often difficult and costly. For example, limitations in spectrum, bandwidth, satellite capacity, etc., may inhibit the addition of new channels. Due to these difficulties, broadcast providers often do not add new content unless a sizeable portion of their consumer base demands the new content.

Open networks, however, do not face those specific difficulties. As such, it is significantly easier to add new content or new channels that are delivered via an open network, such as the Internet. As such, it is desirable for broadcast providers to deliver additional content via an open network. However, delivering content using an open network presents a different set of problems. For example, effectively delivering OTT content requires high network bandwidth on both the provider and subscriber. Networks with such bandwidth tend to be costly and, in some areas, unavailable. Furthermore, after exceeding a threshold of viewers of OTT content, it is more economical for content providers to broadcast the content rather than to sending the content using unicast or multicast to each subscriber. However, a content distribution system that delivers content via both broadcast and using open networks can compensate for the deficiencies of using each type of system on its own. For example, national channels that are widely watched may be sent by broadcast, thereby addressing the economic inefficiencies of distributing widely watched content via an open network, while special interest niche channels may be provided OTT, thereby conserving broadcast bandwidth (e.g., satellite bandwidth). Additionally, some content may be accessible both via broadcast and OTT. Providing distributing the content in both manners provides a subscriber the opportunity to continue accessing the same content in the event that there is a loss of connection or quality issues over one of the distribution systems (e.g., signal disruptions such as rain fade, loss of Internet access, etc.).

However, subscribers are less likely to view the additional content if it requires a new interface to access. As such, it is desirable to provide an interface that includes both traditional broadcast content as well as OTT content. Aggregating information for the channels becomes much more bandwidth intensive when building a hybrid EPG. For example, information about the broadcast content can be provided from a single source, such as the head-end of the broadcaster. Information about the OTT channels, however, is provided by different servers across the network. Thus, a device constructing the hybrid EPG would have to contact every OTT server in order to get information indicating if a subscriber is authorized for a particular OTT channel and/or additional information needed to build the hybrid EPG. Among other benefits, the examples disclosed herein provide for the construction of a hybrid EPG without accessing multiple different sources for information by a device creating the hybrid EPG (e.g., a set-top-box).

In examples, the systems and methods disclosed herein may be practiced in a Digital Video Broadcasting (DVB) compliant system. DVB is a set of internationally accepted open standards for broadcasting digital television. The DVB standards define both the physical layer and the data link layer of a distributed system. There are different DVB standards defining the distribution of content over various media. For example, satellite transmissions are defined in the DVB-S, DVB-S2, and DVB-SH specifications. Cable transmission is defined in the DVB-C and DVB-C2 specifications. Terrestrial television transmission is defined in the DVB-T and DVB-T2 specifications for standard television formats and DVB-H and DVB-H2 for the transmission of mobile television, e.g., television for handheld devices such as mobile phones. Microwave transmission is defined in the DVB-MT, DVB-MC, and DVB-MS standards.

In addition to defining the physical and data link layers, the DVB suite of standards includes three standards that are used to provide conditional access protection of the transmitted content. These standards include the DVB-CA, DVB-CSA, and DVB-CI standards. Conditional access is a method of protecting content by requiring a device to meet certain criteria before it accesses content. Conditional access plays an important role in ensuring that broadcasted content is made available only to subscribers (e.g., cable and satellite customers, etc.). The general DVB architecture uses a global key, called a control word (CW), to perform conditional access. The CW is used to encrypt Audio/Video (A/V) data before it is broadcast to subscribers. The CW is transmitted by a head-end (e.g., a satellite or cable provider) to subscriber devices (e.g., an authorized recipient device) in an entitlement control message (ECM). The ECM is generally encrypted before transmission to the subscriber device. The conditional access system of the subscriber devices (e.g., a secure processor, a smart card, and/or other conditional access modules implemented using hardware and/or software) decrypts the ECM using information received in an entitlement management message (EMM) transmitted from the head-end. The subscriber device can then use the CW to decrypt the content broadcasted by the head-end. As used herein, transmitting content from the head-end may refer to transmission of the content by a device located at or under the control of the head-end. Generally, a CW is used for a certain period of time, or a crypto period. Upon expiration of a crypto period a new crypto period begins. The head-end may then transmit a new CW to subscriber devices and begin using the new CW to encrypt the broadcasted content. The subscriber device can use the new CW to decrypt and access the broadcast content. Broadcast content may include video content, audio content, or other types of media content. While the examples described herein relate to DVB compliant systems, one of skill in the art will appreciate that the aspects disclosed herein may be used with other standard systems such as, for example, the Advanced Television Systems Committee (ATSC) standard, The Integrated Services Digital Broadcasting (ISDB-T) standard, the Sistema Brasileiro de Televisão Digital (ISDB-Tb), among others.

Over-the-top (OTT) content may be delivered over an open network, such as the Internet. In examples, OTT content may be directly delivered to a recipient device, rather than broadcasted to multiple devices. In examples, OTT content may be protected using a digital rights management (DRM) system. In examples, a device attempting to access the OTT content provides information to a DRM server, such as a licensing server, that the licensing server may use for authentication and/or authorization purposes. Upon completion of authentication and/or authorization, a certificate or a license may be provided to the device. The device may use the certificate and/or license to access streamed content from the DRM system, which may be encrypted. The device may use the certificate and/or license to access the encrypted content. In one example, the license and/or certificate may be used to retrieve a key to decrypt the content. In another example, the certificate and/or license may be the key necessary to decrypt the content. OTT content may include video content, audio content, or other types of media content. The OTT content may be a traditional channel that provides set programming, or an on-demand channel that provides specific content in response to a request for the specific content.

Figure 1:
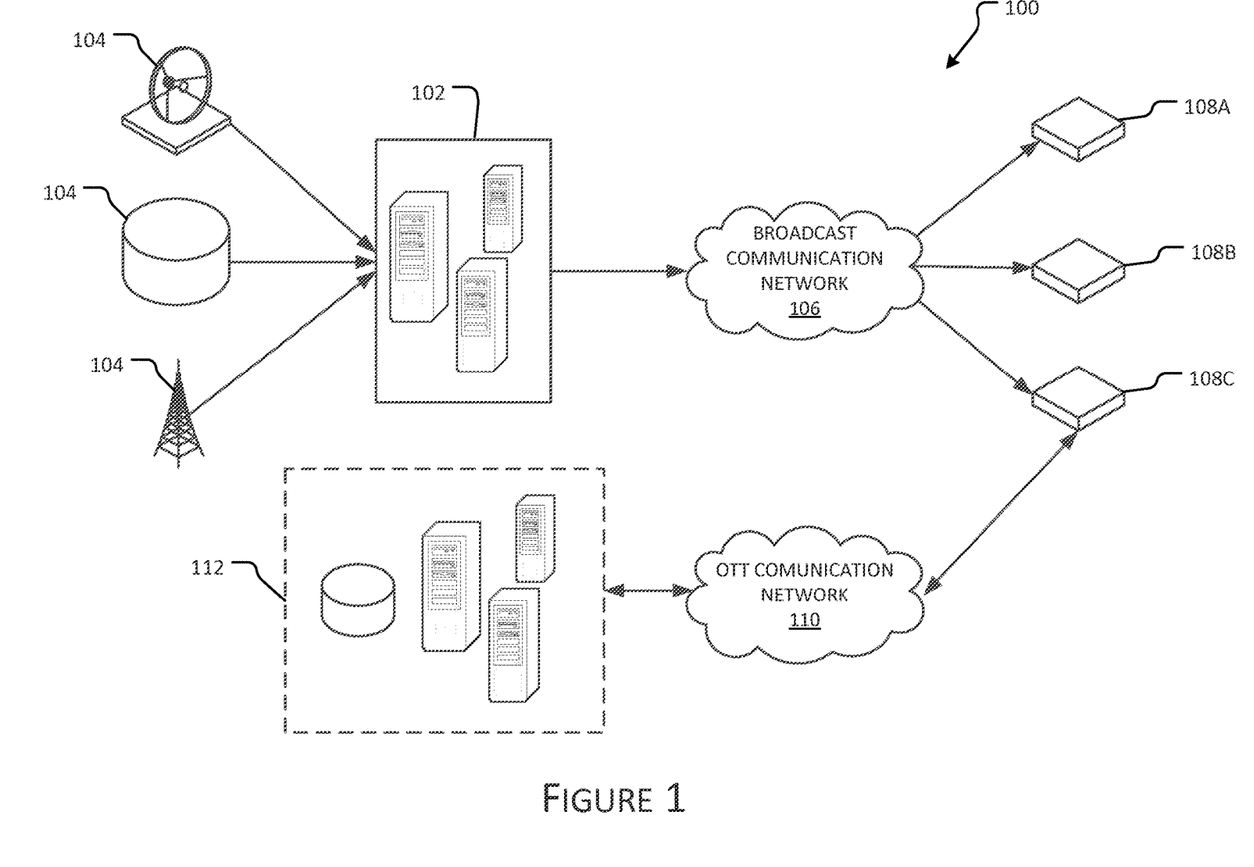
FIG. 1 illustrates a hybrid communications system that may be employed to provide content to devices.

FIG. 1 illustrates a hybrid communications system 100 that may be employed provide content to devices. The hybrid communications system includes a broadcast content delivery portion and an over-the-top (OTT) content delivery portion. The broadcast content delivery portion of the hybrid communications system 100 includes a head-end device 102 that receives content from content providers 104 and distributes the content across a broadcast communication network 106 simultaneously to various recipient devices 108A-C. The recipient devices 108A-C can access and transform the content such that the content can be displayed. A recipient device 108A-C can be any device capable of receiving and decoding a data transmission stream over broadcast communication network 106. Exemplary recipient devices include, but are not limited to, mobile phones, smart phones, personal digital assistants (PDAs), satellite or cable set-top-boxes, desktop computers, laptop computers, tablet computers, televisions, radios, or any other device known to the art. In examples, recipient devices 108A-C associated with subscriber accounts are generally able to access the encryption key used to decrypt the content, while devices that are not associated with a subscriber account are not able to access the encryption key without circumventing the security measures employed by the head-end device 102 broadcasting the content over the broadcast communication network 106. In examples, the OTT content delivery portion provides content over an open network 110 to a specific device, such as device 108C. An example of an open network is the Internet. Other exemplary type of open network include a cellular data network, a wide area network (WAN), a local area network (LAN), a plain old telephone service (POTS) network, or any other type of communication network capable of streaming data. Although broadcast communication network 106 and OTT communication network 110 are illustrated as two separate networks, broadcast content and OTT content can be delivered over the same network. For example, the Internet can be used to deliver both broadcast content and OTT content. Conceptually, the difference between the broadcast communication network 106 and the OTT communication network 110 is the broadcast communication network 106 delivers content to all devices capable of accessing the network, that is, the content is broadcasted, while the OTT communication network 110 delivers directed content, that is, the content is sent to a specific device or devices.

In examples, the head-end 102 may be the distribution point of a cable television provider, a satellite television provider (e.g., a satellite), a terrestrial wireless network, a server broadcasting content over the Internet, or any type of device capable of distributing content over a communications network. One of skill in the art will appreciate that the head-end 102 may be any type of device, or a collection of devices (as the case may be), that are capable of receiving, encrypting, and broadcasting content over a network.

In one example, the content broadcast over communications system 100 may be generated by the head-end device 102. In other examples, the head-end device 102 may receive content from one or more content providers 104. In such examples, the head-end device 102 is in electrical communication with one or more content providers 104. For example, a content provider may be a cable, terrestrial, or satellite television station that transmits content to the head-end device 102 over a wired (e.g., cable, fiber optic, or Internet connection) or wireless connection (e.g., via radio, microwave, or satellite communications). In other examples, the content may reside in a datastore that is in electrical communication with the head-end 102. While FIG. 1 depicts the content providers 104 as being separate entities from the head-end 102, in other examples, the content providers 104 and head-end device 102 may be a single entity.

The head-end 102 is tasked with distributing the content over a network 106 to various recipient devices 108. In examples, the communication network 106 may be the Internet, a cable network, a fiber optic network, a satellite communications network, a terrestrial broadcasting network (e.g., networks communicating over radio or microwave transmission mediums), a cellular data network, a WAN, a LAN, POTS network, or any other type of communication network capable of broadcasting, and/or otherwise facilitating data transmissions between various devices. One of skill in the art will appreciate that the systems and methods disclosed herein can be practiced regardless of the type of communication network used to transmit data between devices. In many cases, the head-end 102 may broadcast the content in a data transmission stream over the communications network rather than sending content to a particular device. Because the content is being broadcast over the broadcast communication network 106, the transmission can be received by any number of devices capable of interacting with the communication network 106. In order to prevent non-authorized users from accessing the broadcasted data transmission stream, the head-end 102 encrypts the data transmission stream before it is broadcast over the communication network 106. Because the network broadcasted content is made available to multiple devices, a common encryption key (e.g., a network control word) may be used to encrypt the network broadcasted content (e.g., network encrypted content). Although not illustrated in FIG. 1 the communication network may also be used to perform two-way communication between the head-end 102 and the recipient devices 108.

In examples, the head-end 102 may periodically transmit a key or a control word (CW) to the various subscriber devices using an ECM message. Additionally, the head-end 102 transmits EMM messages to the various subscribers which contain information necessary to build an EPG as well as information necessary to decrypt the ECM and retrieve the CW. In such examples, the EMM may be decrypted by a secure device or processor, such as a smart card that is part of or connected to the recipient device to retrieve the CW. The smart card may then provide the CW to another component that is part of or in communication with the recipient device to decrypt the content.

A recipient device, such as recipient device 108C, can connect to a digital rights management (DRM) system 112. In examples, the DRM system 112 may include a licensing server, a content server, and/or a content store. Although not shown in FIG. 1, the DRM system may also receive content from a content provider such as a cable, terrestrial, or satellite television station. In alternate examples, the DRM system may include additional devices, servers, and/or stores. In other examples, the DRM system 112 may include fewer devices or servers. The recipient device 108C may access OTT content by sending a request for the content to the DRM system 112 via the OTT communication network 110. In one example, upon receiving the request, the DRM system may perform authentication and/or authorization operations. If the recipient device 108C passes the authentication and/or authorization, the DRM system 112 may provide the recipient device 108C with information necessary to access the OTT content. Because the DRM system 112 is providing content to a single device, the content may be protected using a unique key that only the recipient device 108C has access to. This provides additional protection because, if the key is compromised by an unauthorized party, the unauthorized party can access only the stream provided to the recipient device 108C. In some examples, all content may be encrypted using a global key; however, the global key may be uniquely encrypted using a unique key for each recipient device.

Alternatively, in other examples, the DRM system 112 may leverage the broadcast information such that it does not have to perform authentication and/or authorization prior to providing OTT content to a requesting device. In such embodiments, the DRM system 112 may automatically provide OTT content to any requesting device. The OTT content may be encrypted using a global key, similar to a DVB CW. The information required to decrypt the globally encrypted stream may be provided via the broadcast system over broadcast communication network 106. Under such circumstances, the DRM system 112 does not require resources needed to determine whether or not a requestor is authorized to access the content.

Figure 2:
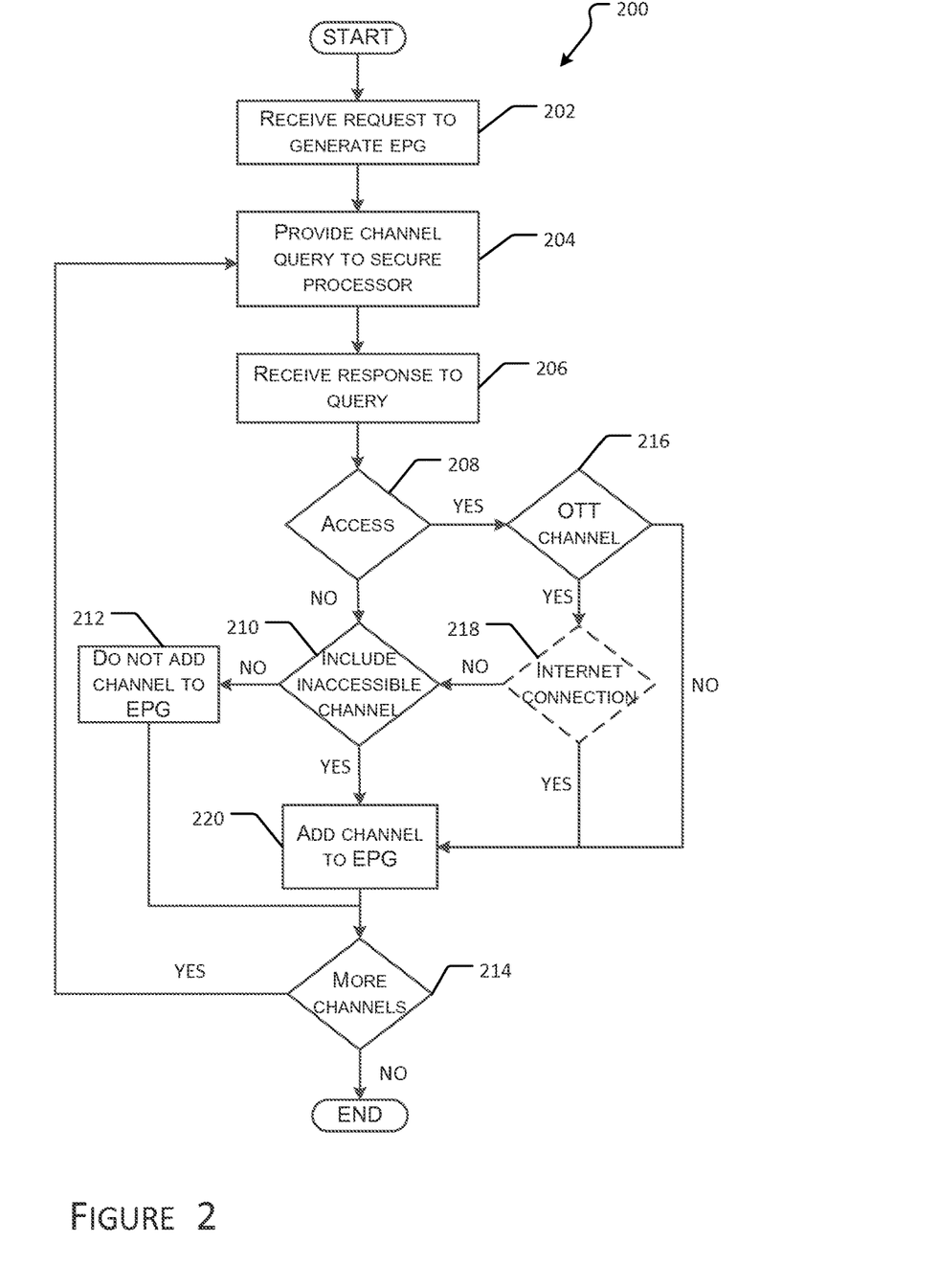
FIG. 2 is an exemplary method for generating a hybrid EPG.

As previously discussed, a recipient device provides better usability if users are able to access broadcast content and OTT content using a single interface. As such, a recipient device, such as recipient device 108C, may construct a hybrid EPG that includes information about broadcast content and OTT content. In examples, the information needed to construct the hybrid EPG may be provided via the broadcast communication network 106. For example, the broadcast communication network 106 may provide information for both broadcast and OTT channels. As such, the recipient device 108C can construct a hybrid EPG without requiring an active connection to DRM system 112. FIG. 2 provides additional detail regarding the construction of a hybrid EPG. Once the hybrid EPG is constructed, the recipient device 108C may receive an indication via the hybrid EPG to access either broadcast content or OTT content. In examples, the recipient device 108C may determine whether the requested content is broadcast content or OTT content and then access the requested content via either the broadcast communication network 106 or the OTT communication network 110.

FIG. 2 is an exemplary method 200 for generating a hybrid EPG. The method 200 may be performed by a set-top-box or any other type of recipient device, such as recipient device 108 in FIG. 1. The operations of the method 200 may be implemented in hardware, software, or a combination of hardware and software. Flow begins at operation 202, where a request to generate an EPG is received. The request to generate the EPG may be made in response to a trigger, such as, for example, receiving a request to display the EPG. In other examples, the request may be automatically generated upon startup of the device performing the method 200. In still further examples, the EPG may be generated periodically. One of skill in the art will appreciate that the request for the EPG may be received in response to a number of different actions or triggers without departing from the scope of this disclosure. Generating a query may comprise looking a channel up from a table of channels that includes a list of the possible channels. In examples, the list of possible channels may be provided as part of the service information (SI). The SI may be received from a head-end. The SI may include a service type attribute which indicates whether a channel is a broadcast channel, an OTT channel, or both. The channel may be identified by number, by name, or by any other type of identifier. In examples, the channels that are included in the EPG may be determined based upon a subscription. That is, if the channel is included in the subscription, the channel may be included in the EPG. Alternatively, a channel may still be included in the EPG even if it is not covered in the subscription but may be identified as inaccessible in the EPG using some sort of visual indicator. A query may be submitted to the secure processor in order to determine if a subscriber has access to a particular channel.

Flow continues to operation 204 where a channel query is provided to a secure processor. In one example, a secure processor may be any type of secure processor employed by a conditional access system. The secure processor may be compliant with a standard, such as one of the DVB standards, the ATSC standard, the ISDB-T standard, etc. In examples, the secure processor may be a smart card. In one example, the secure processor is local to the device performing the method 200. When the secure processor is local to the device, the device can directly submit the query to the secure processor. As such, a network connection may not be necessary for submitting the query to the secure processor. One such example of a secure processor is a smart card for a set-top-box. Other types of secure processors include, but are not limited to, a cableCARD, a chip card, an integrated circuit card, a secure USB compatible device, or any other type of secure processor known to the art. In examples, the secure processor is capable of accessing protected broadcast information. For example, the secure processor may be able to decrypt EMMs and ECMs that are delivered via a broadcast, such as a transmission from a satellite. The secure device is capable of accessing control words, information about a channel, subscription information, or other types of protected information. In examples, the subscription information stored by the secure device may be provisioned via the broadcast or via the open network, or via both networks. For example, the subscription information for a smartcard is provisioned over the broadcast network. Such information may be used by the secure processor to determine whether or not the subscriber has access to the queried channel. The information may be provided by a head-end device. One type of such information is service information. Non-limiting examples of service information include a channel number, a subscription identifier, an Internet Protocol (IP) address, a port number, a uniform resource locator (URL), a uniform resource identifier (URI), a transponder Packet ID (PID), or any other type of information about the channel or required to access the channel.

The secure processor provides an indication of whether the queried channel is included in the subscription. The secure processor may generate the indication for the queried channel based upon the service information. For example, the subscription identifier associated with the channel can be compared to a subscription identifier associated with the device. If the two subscription identifiers match, the device has access to the channel. If they do not match, the device does not have access to the channel. One of skill in the art will appreciate that other information may be used to determine whether the device has access to the channel without departing from the spirit of this disclosure. Flow continues to operation 206 where a response is received from the secure processor. In example, the response comprises an indication of whether or not the queried channel is included in the subscription. Flow continues to decision operation 208 where, based upon the response received from the secure processor, a determination is made as to whether the device performing the method 200 has access to the channel being queried. If device does not have access to the channel, flow branches NO to decision operation 210 where a determination is made as to whether the inaccessible channel should be added to the hybrid EPG anyway. For example, instead of not adding the channel to the hybrid EPG, the channel may still be added to the hybrid EPG in a manner that indicates that the channel is not available to the device. It may be preferable to add the channel to the hybrid EPG even when the device does not have access to the channel in order to provide subscribers with information about channels they do not subscribe to so the subscriber can decide whether or not she wants to add the channel to her subscription. On the other hand, some subscribers may prefer not to include channels that they do not have access to in order to make the hybrid EPG easier to read. The determination of whether or not to include an inaccessible channel may be based upon a setting that is adjustable by the service provider or the subscriber.

If it is determined that the channel should not be added to the hybrid EPG, flow branches NO to operation 212 and the channel is not included as part of the hybrid EPG. Flow then proceeds to decision operation 214 where a determination is made as to whether or not there are more channels to add to the hybrid EPG. For example, if there are additional channels in the listing of channels that have not been queried for access, there may be more channels needed to add to the hybrid EPG. If there are more channels to query, flow branches YES and returns to operation 204 and the method 200 continues.

Returning to decision operation 208, if it is determined, based upon the indication received from the secure processor, for example, that the device has access to the queried channel, flow branches YES to decision operation 216. At decision operation 216 a determination is made as to whether or not the channel is an over-the-top content (OTT) channel. In examples, an OTT channel provides content over an open network, such as the Internet. Unlike a broadcast channel which is used to send content to multiple devices (e.g., a satellite signal), an OTT channel provides content directly to a device, for example, via a unicast or multicast transmission. Broadcast channels are generally transmitted from a head-end (e.g., a satellite, a cable operator, etc.) to multiple devices while OTT channels may be streamed from a server to a single device via a network connection. The decision may be based off of the information returned from the secure processor. In one example, the secure processor may provide an explicit indication that the channel is an OTT channel. In another example, the determination may be based off of the service information that is provided along with the broadcasted content. For example, if the service information includes an IP address, a URL, a URI, a port number, or any other type of network address, the determination can be made that the channel is an OTT channel. On the other hand, if the service information includes a transponder PID, then it can be determined that the channel is a broadcast channel. If it is determined that the channel is not an OTT channel (e.g., it is a broadcast channel), flow branches NO to operation 220 and the channel is added to the hybrid EPG. Adding the broadcast channel to the hybrid EPG may include adding information about the channel, such as, but not limited to, the channel number, the channel name, and/or program information, such that the added information may be displayed in the hybrid EPG. A visual indicator may also be associated with the channel to indicate that the channel is a broadcast channel. After adding the broadcast channel to the hybrid EPG, flow continues to operation 214 and continues accordingly.

Returning to decision operation 216, when it is determined that the channel is an OTT channel, flow branches YES to optional decision operation 218. In examples, at optional decision operation 218, a determination may be made as to whether or not the device performing the method 200 has an active network connection. Because OTT content is delivered over an open network, such as the Internet, an active network connection may be required to receive content from the OTT channel. As such, even if the device has access to the OTT channel, that is, the subscription associated with the device includes the OTT channel, it may be preferable not to include the OTT channel in the hybrid EPG if the channel is not accessible due to a lack of a network connection. In examples, in order to determine whether a network connection is active, the device performing the method 200 can perform a number of different actions including a host discovery operation, ping scanning, a ping sweep, or any other type of network connection test known to the art. If it is determined that the device does not have an active network connection, flow branches NO to decision operation 210 where a determination is made as to whether the OTT channel should be added to the hybrid EPG anyway. If it is determined that the OTT channel should be added anyway, flow branches to operation 220 and the OTT channel is added despite the fact that the channel is not accessible due to a connectivity issue. In one example, the OTT channel may still be added to the hybrid EPG in a manner that indicates that the channel is not available due to a lack of network connectivity. The method 200 then proceeds to decision operation 220 and flow continues from there. Returning to decision operation 218, if there are no connectivity issues, flow branches YES to operation 220, the OTT channel is added to the hybrid EPG, and the method 200 continues.

In the examples described, decision operation 218 is optional. For example, it may be beneficial to include the OTT channel in the hybrid EPG even if the network connection is not active. Doing so may provide a viewer with information about additional channels that can be accessed if a network connection is established. If optional decision operation 218 is not performed then returning to operation 216, flow continues (NO) to operation 220. At operation 220, OTT channel is added to the hybrid EPG. Adding the OTT channel to the hybrid EPG may include adding information about the channel, such as, but not limited to, the channel number, the channel name, and/or program information, such that the added information may be displayed in the hybrid EPG. In further examples, adding the OTT channel to the hybrid EPG may include adding an indication that the channel is an OTT channel. For example, an indicator such as "IP," "OTT," "Streaming," or any other type of indicator may be added. As such, users are able to tell whether the channel they are selecting is an OTT channel or a broadcast channel. After adding the OTT channel to the hybrid EPG, flow continues to decision operation 214 and the method 200 continues as previously described.

The method 200 allows for the construction of a hybrid EPG without requiring a network connection to an OTT server. There may be any number of different OTT servers that provide content to a device. Previously, a device constructing an EPG that included both broadcast and OTT channels would have to communicate with each OTT server, or at the very least an OTT directory server, in order to receive information about an OTT channel and determine whether the OTT channel should be included in the hybrid EPG. Doing so required a significant number of network requests needed to construct the EPG, which resulted in increased bandwidth requirements as well as slower construction of the EPG due to network lag. The examples disclosed herein, among other benefits recognizable to those of skill in the art, provide the benefit of constructing a complete hybrid EPG based on information received by the secure device. In examples, the secure device receives information from a head-end. Thus, the examples disclosed herein provide for the construction of the hybrid EPG based off of broadcasted information. For example, the list of all the OTT channels, as well as information required to determine whether or not a user has access to the individual OTT channels, is provided in the SI information that is transmitted as part of the broadcast stream. As such, the examples herein provide for the construction of a hybrid EPG without an active OTT network connection.

Figure 3:
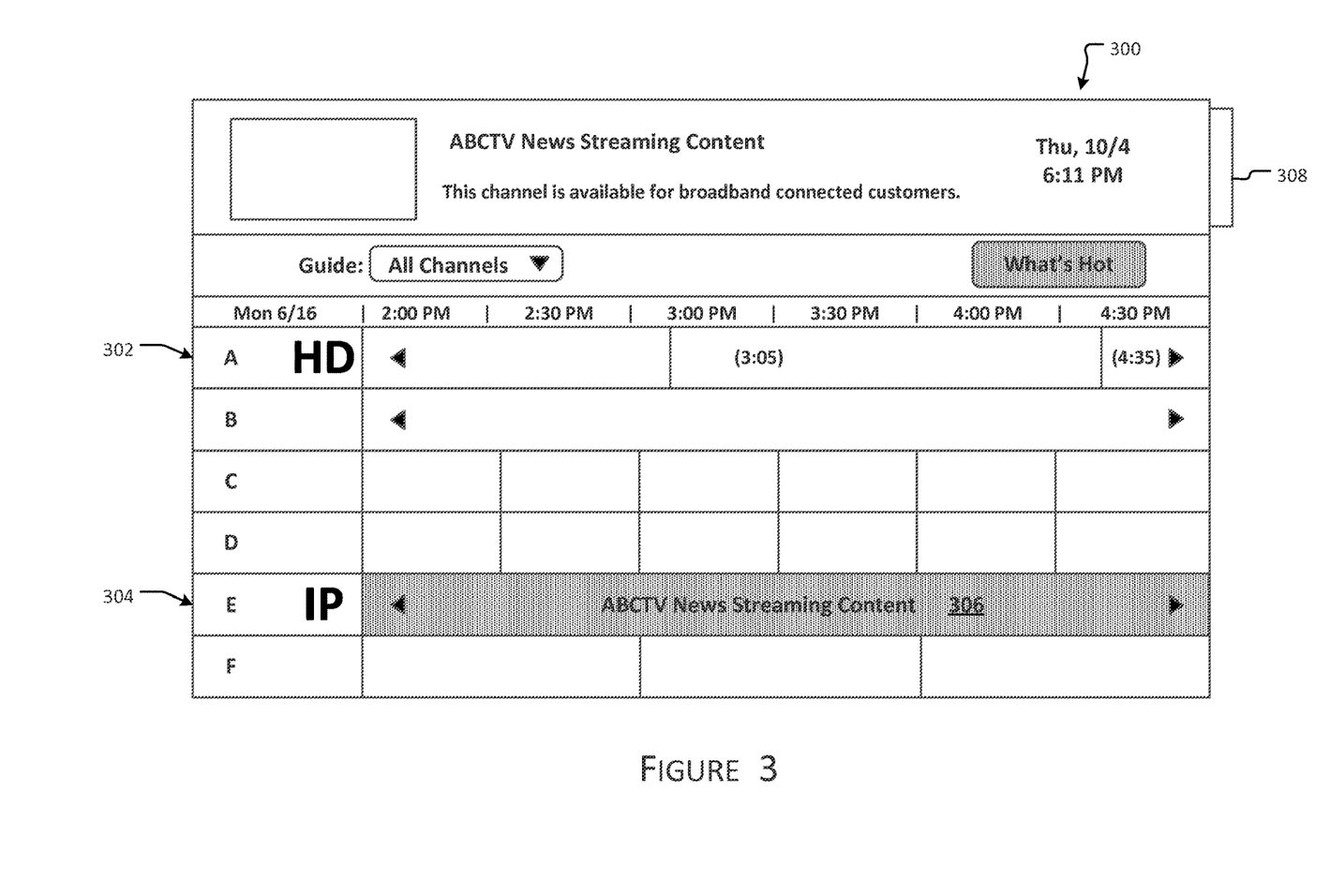
FIG. 3 is an example of a hybrid EPG.

FIG. 3 is an example of a hybrid EPG 300. As illustrated in FIG. 3, the hybrid EPG includes both broadcast channels, such as channel A, identified by reference number 302, as well as OTT channels, such as channel E, which is identified by reference number 304. In examples, a channel may include an indication identifying the channel as an OTT channel. For example, channel E 304 includes the "IP" indicator which signifies that the channel is an OTT channel. One of skill in the art will appreciate that other indicators may be used without departing from the spirit of this disclosure. For example other text indicators such as "OTT" or "Streaming" may be added, a graphical indicator may be added, or the OTT channels may be highlighted using a different color or displayed using a different font.

As illustrated in FIG. 3, the hybrid EPG may include a listing of programs on the different channels. The programs may be divided up by timeslots. In the illustrated example, the OTT channel E 304 may display a block of streaming content. The content may include a title or descriptor. In the illustrated example, the content of channel E 304 contains the descriptor "ABCTV News Streaming Content." Additional information about the channels may also be included in the hybrid EPG 300. The description and channel title may be displayed in a blocked program entry, such as entry 306. Additionally, the hybrid EPG 300 may include an information section 308. The information section may include a channel name, channel number, a program name, a channel description, and indication of whether the channel is a broadcast channel or an OTT channel, subscription information, and/or date and time.

Figure 4:
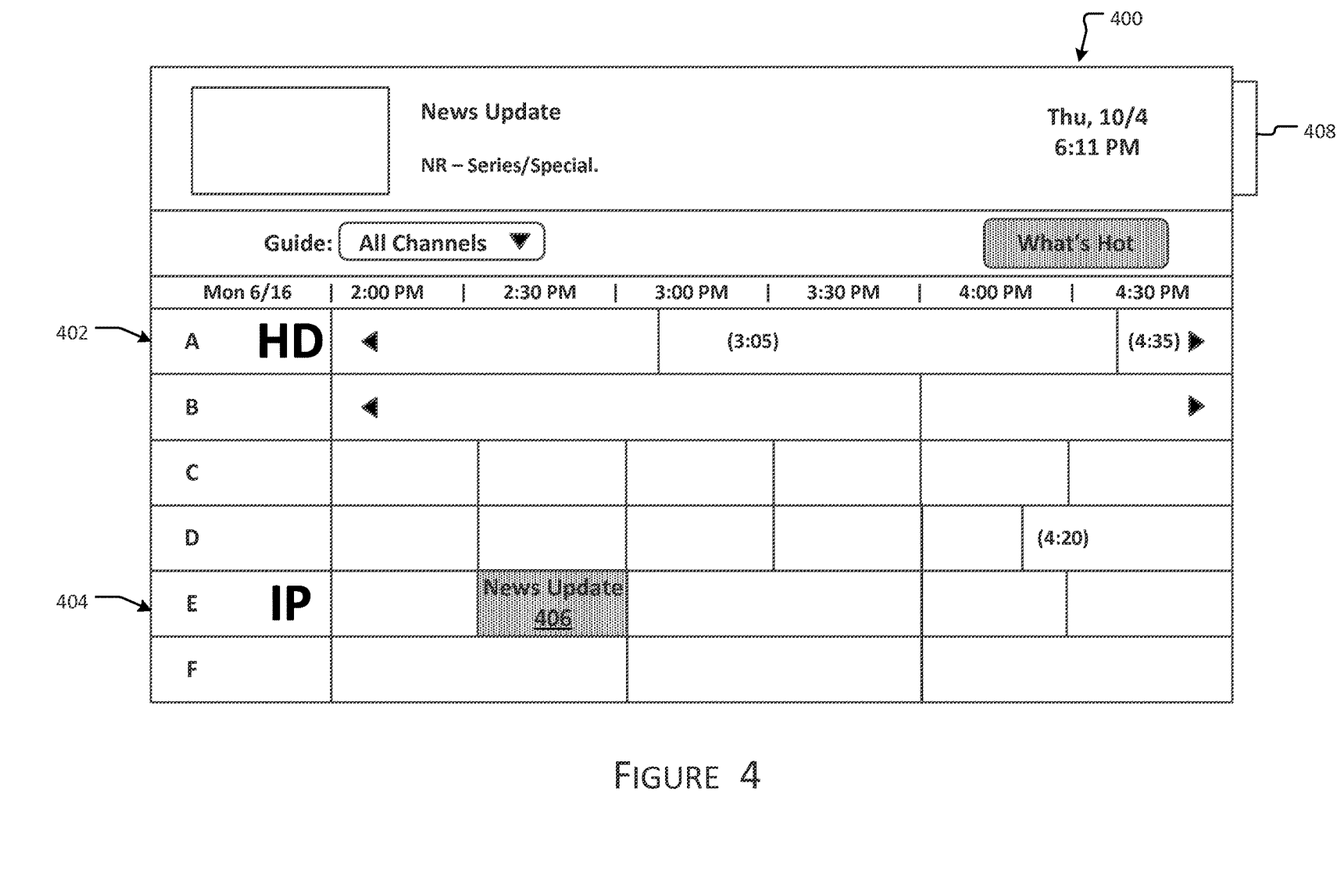
FIG. 4 is another example of a hybrid EPG.

FIG. 4 is yet another example of a hybrid EPG 400. The hybrid EPG 400 includes broadcast channels, such as channel A 402, and OTT channels, such as channel E 404. As discussed with respect to FIG. 3, channel E 404 may include an indicator that the channel is an OTT channel. However, rather than showing a block of streaming content in the hybrid EPG (e.g., entry 306 of FIG. 3), the OTT content may be displayed as separate programs in a manner similar to the display for different programs of a broadcast channel. For example, program entry 406 corresponds to a single program called "News Update." Hybrid EPG 400 may also include an information section 408 that may be used to display additional information about a highlighted program, such as program entry 406.

Figure 5:
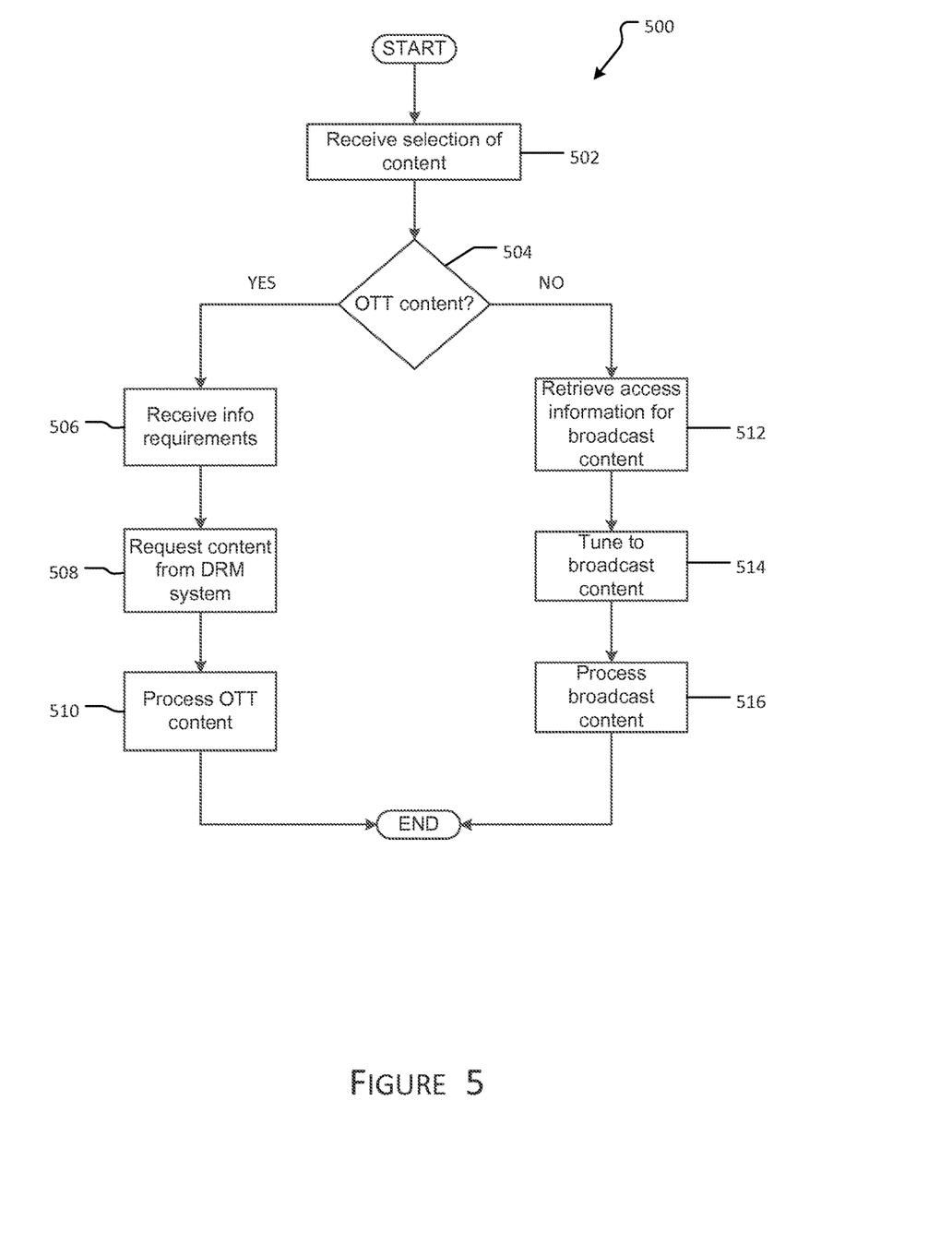
FIG. 5 is an exemplary method for accessing content requested via a hybrid EPG.

Having described the construction of a hybrid EPG, the disclosure will now describe the methods performed upon receiving an input via the hybrid EPG. FIG. 5 is an exemplary method 500 for accessing content requested via a hybrid EPG. The method 500 may be performed by a set-top-box or any other type of recipient device, such as recipient device 108 in FIG. 1. The operations of the method 500 may be implemented in hardware, software, or a combination of hardware and software. Flow begins at operation 502 where a selection of content is received. In one example, the selection of content may be received via a hybrid EPG. For example, the device performing the method 500 may receive selection of a channel or a program displayed in the hybrid EPG, such as through the use of a remote control to highlight and select such channel. In such an embodiment, an additional determination may be made as to whether the device is authorized to access the selected channel or program based on subscription information. In alternate examples, receiving a selection of content may comprise receiving an instruction to tune to a specific channel. For example, the device may receive an instruction to tune to a specific channel via a remote control rather than receiving a selection via a hybrid EPG.

Upon receiving the selection, flow continues to decision operation 504. At decision operation 504, a determination is made as to whether the selected content is OTT content or broadcast content. If the selection is OTT content, flow branches YES to operation 506. At operation 506, information about the OTT content is received or otherwise accessed. The received or accessed information may include information needed to retrieve the requested OTT content. Examples of such information include, but are not limited to, an IP address of a server or DRM system, a URL, a URI, a port number, or any other type of information that is capable of identifying a device or content that resides in an open network. Flow continues to operation 508 where, using the content retrieved at operation 506, a request is sent to a server for the OTT content. In one example, the request may be sent to a DRM system. The request sent at operation 508 may include authentication and/or authorization information from the device. In alternate examples, one or more additional messages that contain authentication and/or authorization information may be sent from the device. The additional messages may be sent in response to a request for information from a DRM system.

Alternatively, the request may be sent without providing authentication and/or authorization information. For example, the DRM system may encrypt OTT content using a global key, similar to a DVB control word. In such examples, the global key may be provided to a secure processor that is part of or connected to the recipient device, such as a smart card, via a broadcast communication channel. For example, the global key could be provided in an ECM or an EMM. After receiving the OTT content, flow continues to operation 510 where the OTT content is processed. Processing the OTT content may include decrypting the OTT content, performing a conversion on the OTT content, displaying the OTT content, and/or storing the OTT content. The method 500 then terminates.

Returning to decision operation 504, if it is determined that the selected content is not OTT content, flow branches NO to operation 512. In examples, if the selected content is not OTT content, then the selected content is broadcast content. At operation 512, information about the broadcast content is retrieved. For example, the transponder PID and/or a control word may be retrieved at operation 512. While specific types of information are detailed herein, one of skill in the art will appreciate that other types of information may be retrieved at operation 512. For example, frequency information may be retrieved if the content is provided by a terrestrial broadcaster. Any type of information used to identify and/or access content may be retrieved at operation 512. Flow then continues to operation 514 where the device performing the method tunes to or otherwise retrieves the content using at least the information retrieved at operation 512. For example, the content may be retrieved by tuning the device to the broadcast channel. Flow then proceeds to operation 516 where the broadcast content is processed. Processing the broadcast content may include decrypting the broadcast content, performing a conversion on the broadcast content, displaying the broadcast content, and/or storing the broadcast content. The method 500 then terminates.

As described above, the examples disclosed herein allow a recipient device to construct a hybrid EPG that includes OTT channels without having to contact each OTT provider. This provides bandwidth savings for the consumer using the recipient device as well as the provider of the OTT content, who would otherwise have to provide OTT data to each subscriber device. Additionally, the systems and methods disclosed herein provide for the quicker generation of a hybrid EPG due to the fact that the information needed to build the hybrid EPG can be obtained without contacting each OTT server. In examples, OTT data may be data that is provided in the service information for an OTT channel. OTT data may include, but is not limited to, a channel number, a subscription identifier, an IP address, a port number, a URL, a URI, and/or information indicating whether or not a subscriber is authorized to access the OTT channel. In further examples, the OTT data may also include information about the OTT content, such as a description of the content, the time the content will be streamed or otherwise made available to a recipient device, etc. As such, the OTT data may be included in a hybrid EPG.

Having described various systems and methods for constructing and utilizing a hybrid EPG, this disclosure will now describe various hardware components that may be used as part of the systems or to perform the methods disclosed herein.

Figure 6:
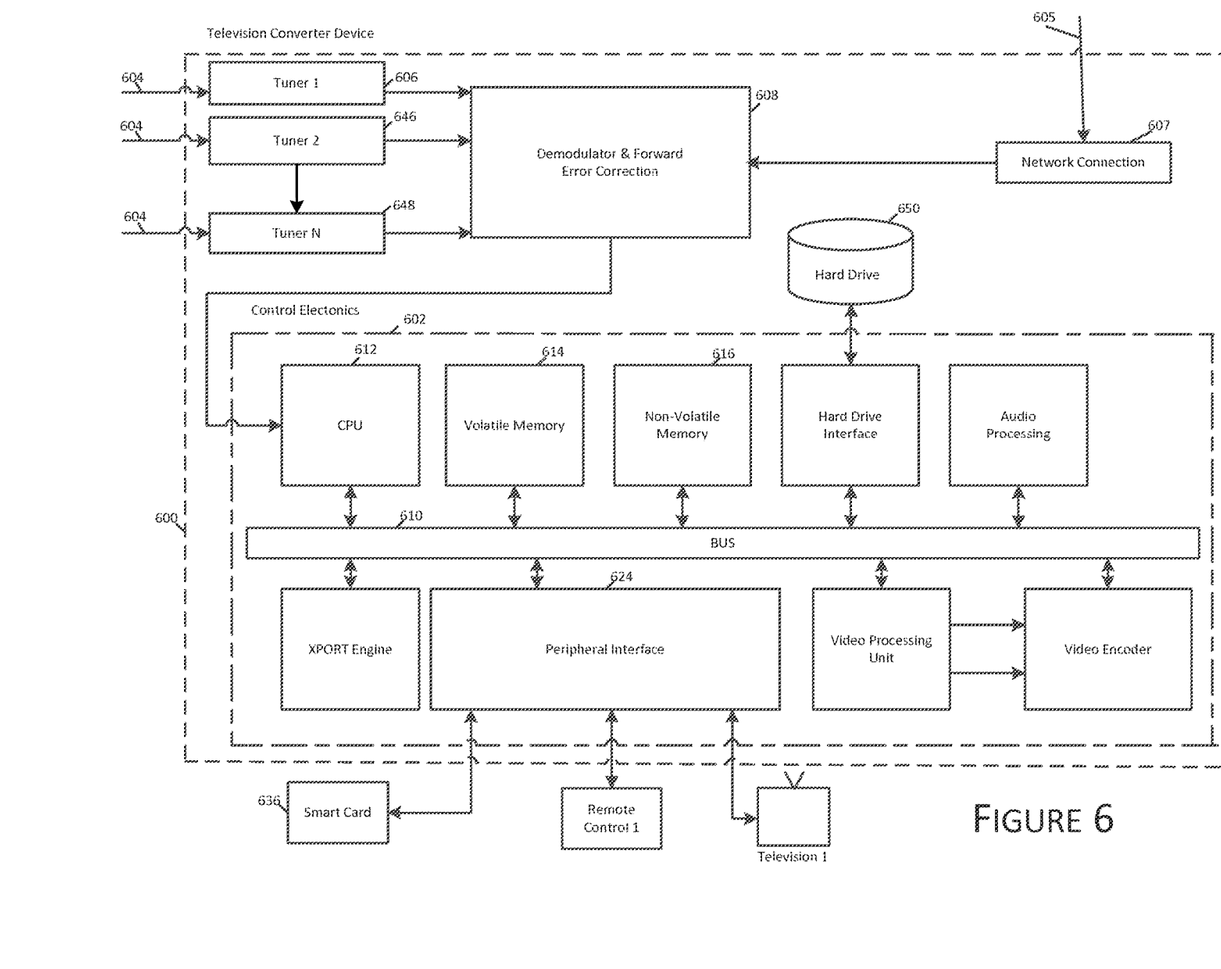
FIG. 6 is an example of a set-top-box that may be used to perform the methods and be part of the systems disclosed herein.

FIG. 6 is an example of a set-top-box 600 that may be used to generate and utilize a hybrid EPG and/or be part of the systems disclosed herein. For example, recipient device 108C of FIG. 1 may comprise a set-top-box 600. In another example, different recipient devices such as, but not limited to, a smart phone, a tablet computer, a laptop, or any other type of device may be employed herein that some of the components illustrated in FIG. 6. While FIG. 6 is illustrated with various components, many of the components are known to the art and do not need explanation. Only the components that may be used to perform the methods disclosed herein are described. The signal 604 that arrives at the set-top-box 600 may undergo extensive processing. The television converter 600 may include one or more tuner devices 606, 646, 648 that may receive a signal 604. Signal 604 may be broadcast signal such as a satellite signal, a cable signal, or any other type of signal received over a wired or wireless network. In this example, tuner devices 606, 646, 648 acquire a signal 604 from a head-end or content provider. Tuner devices 606, 646, 648 may initially process the signal 604. Tuner device 606, 646, 648 may also receive subscriber commands in the form of signals from control electronics unit 602. Signals from control electronics unit 602 may include, but is not limited to, a signal to tune to a transponder as part of the process of selecting a certain channel for viewing on a peripheral device. One skilled in the art would recognize that the tuner devices 606, 646, 648 may include fewer, more, or different components. The signal 604 may include content encoded by a network control word. The signal 604 may also include one or more ECMs and EMMs. Set-top-box 600 may also include a network connection 607 capable of receiving network signals 605. Network connection 605 may be a wired or wirelesses connection. For example, network connection could be a modem, an Ethernet connection, a cable modem, a DSL modem, a wireless adaptor, an infrared link, or any other type of network connector known to the art. The network signals may include OTT content and/or keys, licenses, or certificates to access the OTT content.

After receiving the signal 604, one of the first steps may be to demodulate 608 the signal 604. The signal 604 may arrive as an analog signal that "carries" data (e.g., data is modulated onto the analog signal). Demodulation 608 may be accomplished by reversing the modulation process. Modulation can be done in several ways. Modulation may include amplitude modulation (AM) or frequency modulation (FM). If the carried data is digital, modulation methods include, but are not limited to, biphase-shift keying (BPSK), quadraphase-shift keying (QPSK), or eight-phase shift keying (8PSK). One skilled in the art will recognize that other methods of modulating and demodulating the signal 604 may be possible. Another one of the first steps may also be to error check 608 signal 604. One example of error checking 608 is forward error checking (FEC). FEC 608 may include, but is not limited to, inspecting parity bit or bits that may accompany signal 604. One skilled in the art will recognize that many methods for error checking are possible. For the purposes of discussion, an example using digital data will be discussed below. However, one skilled in the art will recognize that systems with analog data or combined analog and digital data are also possible and contemplated herein.

In examples, set-top-box 600 contains control electronics unit 602 that receives signal 604. One skilled in the art will recognize that control electronics 602 may receive other signals, including, but not limited to, signals from a cable, satellite, or broadcast television distributor. In this example, control electronics unit 602 includes discrete electronic components combined into a single circuit with a shared bus 610. In other examples, control electronics unit 602 may be configured differently. For example, one or more of the control electronics unit 602 components in set-top-box 600 may be combined or omitted. As a further example, one or more of the control electronics unit 602 components in set-top-box 600 may not share a bus 610, but may nonetheless be operatively connected by some other means. One skilled in the art will recognize that other configurations of set-top-box 600 and control electronics unit 602 are possible and within the scope of this invention. One skilled in the art will further recognize that some components of set-top-box 600 and control electronics unit 602 may be implemented in hardware or software. The control electronics unit 602 may operate under the control of a software program, firmware program, or some other program stored in memory or control logic. One skilled in the art will also recognize that the control electronics unit 602 may include other electronic components or structures to mediate or process signals.

Control electronics unit 602 may contain one or more central-processing-units (CPUs) 612 or processors. In this example, control electronics unit 602 contains a single CPU 612 that is operatively connected to the shared bus. In this example, CPU 612 may be used, among other things, for logical operations for set-top-box 600 functions including, but not limited to, channel selection, recording control, EPG display and control and system maintenance. One skilled in the art will recognize that the CPU 612 may be integrated with memory or other discrete electronics components. In examples, CPU 612 may be used to perform the systems and methods disclosed herein. For example, CPU 612 may be used to perform a method of building and/or utilizing a hybrid EPG.

Control electronics unit 602 may contain one or more volatile memory components 614. Volatile memory components 614 may include, but are not limited to, one or more SDRAM memory chips. Similarly, control electronics unit 602 may also contain one or more non-volatile memory components 616. Non-volatile memory 616 may include one or more memory chips, including, but not limited to, ROM and Flash. One skilled in the art will recognize that volatile memory 614 and non-volatile memory 616 may be integrated within other electronics components. One skilled in the art will also recognize that other memory components may be included within set-top-box 600 and control electronics unit 602. One skilled in the art will recognize that memory 614, 616 may be used for many purposes, including, but not limited to, storing EPG data and storing data for use by CPU 612. In examples, the Volatile memory components 614 and/or one or more non-volatile memory components 616 may be used to store the instructions to perform methods 200 and 500 disclosed herein. Non-volatile memory 616 may be used to store broadcast content or OTT content. In other examples, hard drive 650 may be used to store the broadcast content or OTT content.

A set-top-box 600 may be connected to one or more peripheral electronic devices through peripheral interface 624. These peripheral devices may include a smart card 636. In examples, the smart card 636 acts as a conditional access system. In such examples, the smart card 636 may performs the methods disclosed herein or may communicate information to another processor that is performing the methods disclosed herein. In still further examples, smart card 636 may have the components described with respect to FIG. 7. Peripheral interface 624 may also act as an I/O connection to provide the clear content to a display device, such as, but not limited to, a television and speakers.

Figure 7:
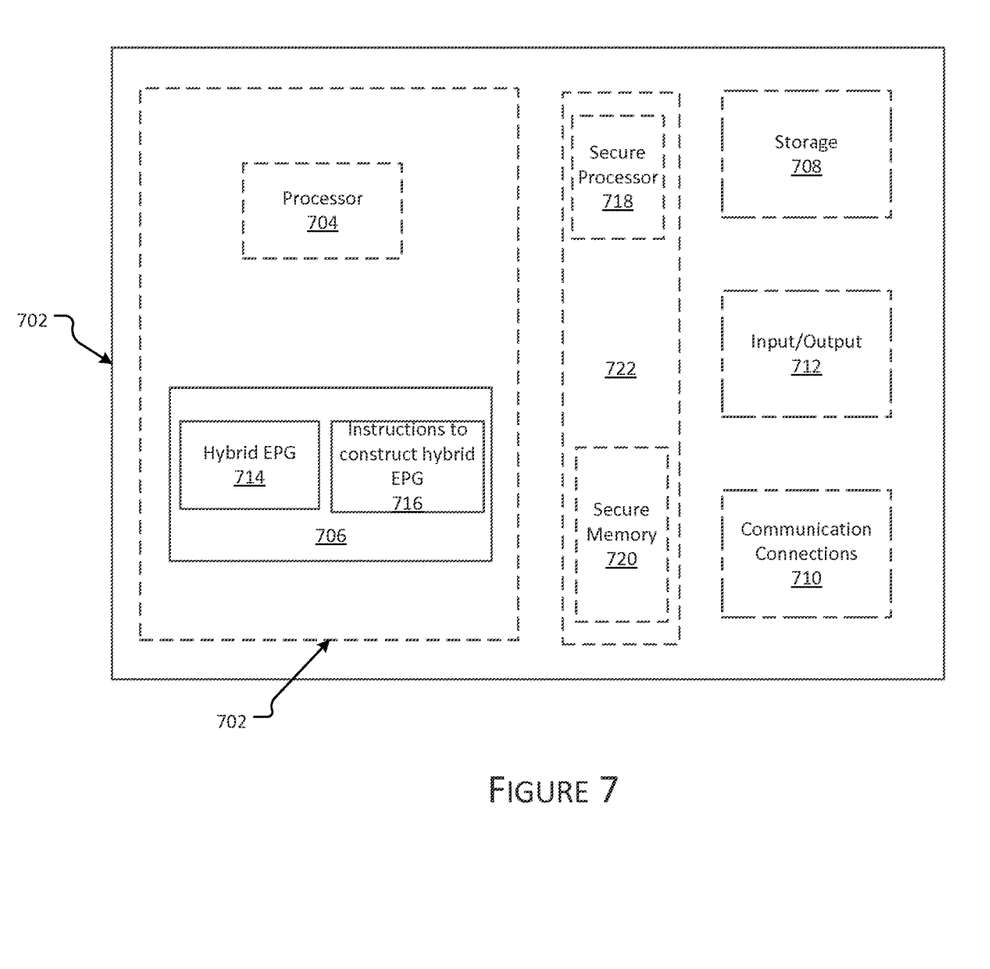
FIG. 7 illustrates an example of a computer environment and computer system for implementing the systems and methods disclosed herein.

With reference to FIG. 7, an example of a computing environment for implementing the various examples described herein includes a computer system, such as computer system 700. Any and all components of the described examples (such as the DVR, the content storage sever, a laptop, mobile device, personal computer, a smart phone, a secure processing device, etc.) may execute as or on a client computer system, a server computer system, a combination of client and server computer systems, a handheld device, and other possible computing environments or systems described herein. As such, a basic computer system applicable to all these environments is described hereinafter.

In its most basic configuration, computer system 700 comprises at least one processing unit, such as processor 704, and system memory 706. The most basic configuration of the computer system 700 is illustrated in FIG. 7 by dashed line 702. In some examples, one or more components of the described system are loaded into system memory 706 and executed by the processing unit 704 from system memory 706. Depending on the exact configuration and type of computer system 700, system memory 706 may be volatile (such as RAM), non-volatile (such as ROM, flash memory, etc.), or some combination of the two.

Additionally, computer system 700 may also have additional features/functionality. For example, computer system 700 may include additional storage media 708, such as removable and/or non-removable storage, including, but not limited to, magnetic or optical disks or tape or solid state storage. In some examples, software or executable code and any data used for the described system is permanently stored in storage media 708. Storage media 708 includes volatile and non-volatile, removable and non-removable media implemented in any method or technology for storage of information such as computer readable instructions, data structures, program modules, or other data.

System memory 706 and storage media 708 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage, other magnetic storage devices, solid state storage or any other tangible, non-transitory medium which is used to store the desired information and which is accessed by computer system 700 and processor 704. Any such computer storage media may be part of computer system 700. In some examples, system memory 706 and/or storage media 708 may store data used to perform the methods or form the system(s) disclosed herein. In other examples, system memory 706 may store information such as the hybrid EPG itself 714 and logic 716 to perform the methods of constructing and utilizing a hybrid EPG disclosed herein.

Computer system 700 may also contain communications connection(s) 710 that allow the device to communicate with other devices. Communication connection(s) 710 is an example of communication media. Communication media may embody a modulated data signal, such as a carrier wave or other transport mechanism and includes any information delivery media, which may embody computer readable instructions, data structures, program modules, or other data in a modulated data signal. The term "modulated data signal" means a signal that has one or more of its characteristics set or changed in such a manner as to encode information or a message in the data signal. By way of example, and not limitation, communication media includes wired media such as a wired network or direct-wired connection, and wireless media such as an acoustic, RF, infrared, and other wireless media. In an example, content and metadata may be transmitted over communications connection(s) 710.

In some examples, computer system 700 also includes input and output connections 712, and interfaces and peripheral devices, such as a graphical user interface. Input device(s) are also referred to as user interface selection devices and include, but are not limited to, a keyboard, a mouse, a pen, a voice input device, a touch input device, etc. Output device(s) are also referred to as displays and include, but are not limited to, cathode ray tube displays, plasma screen displays, liquid crystal screen displays, speakers, printers, etc. These devices, either individually or in combination, connected to input and output connections 712 are used to display the information as described herein. All these devices are well known in the art and need not be discussed at length here. In further examples, the input and output connections 712 may be used to communicate with a removable secure processor, such as, but not limited to, a smart card.

In further examples, computer system 700 may include a secure processor 718 and secure memory 720 that may be used to perform some of the methods disclosed herein. In examples, the secure processor 718 and secure memory 720 of the computer system 700 may comprise a secure area 722 that is not generally accessible by the other components of computer system 700 or by other processes executing on the computer system 700. In such examples, network control words and other protected information, such as, for example, the decryption keys may remain within the secure area 722, thereby reducing the chance of interception and sharing by unauthorized parties.

In some examples, the components described herein comprise such modules or instructions executable by computer system 700 that may be stored on computer storage medium and other tangible, non-transitory mediums and/or transmitted in communication media. Computer storage media includes volatile and non-volatile, removable and non-removable media implemented in any method or technology for storage of information such as computer readable instructions, data structures, program modules, or other data. Combinations of any of the above should also be included within the scope of readable media. Computer storage media does not include communications media or a signal. In some examples, computer system 700 is part of a network that stores data in remote storage media for use by the computer system 700.

This disclosure described some examples of the present invention with reference to the accompanying drawings, in which only some of the possible examples were shown. Other aspects may, however, be embodied in many different forms and should not be construed as limited to the examples set forth herein. Rather, these examples were provided so that this disclosure was thorough and complete and fully conveyed the scope of the possible examples to those skilled in the art.

Although specific examples were described herein, the scope of the invention is not limited to those specific examples. One skilled in the art will recognize other examples or improvements that are within the scope and spirit of the present invention. Therefore, the specific structure, acts, or media are disclosed only as illustrative examples. The scope of the invention is defined by the following claims and any equivalents therein.

What is claimed is:

1. A method for generating a hybrid electronic programming guide (EPG) by a device, the method comprising:
   in response to a request to generate the hybrid EPG, receiving, from a headend device, service information at a removable secure processor, wherein the service information comprises data relating to a first channel, and wherein the first channel is an over-the-top (OTT) channel;
   sending, to the removable secure processor, a first query for the first channel;
   using, by the removable secure processor, the service information to determine whether the removable secure processor has access to the first channel;
   when it is determined that the removable secure processor does not have access to the first channel, adding the first channel to the hybrid EPG with a first indicator that the first channel is inaccessible and a second indicator that the first channel is an OTT channel;
   when it is determined that the removable secure processor has access to the first channel, adding the first channel to the hybrid EPG; and
   displaying the hybrid EPG, wherein the hybrid EPG is generated using the service information.

2. The method of claim 1, further comprising receiving service information comprising information about a first channel from a broadcast transmission, and wherein the first response is based at least upon the service information.

3. The method of claim 2, wherein the information about the first channel comprises at least one of:

a channel number;
a subscription identifier;
an Internet Protocol (IP) address;
a uniform resource locator (URL); and
a port number.

4. The method of claim 2, further comprising:
sending a second query for a second channel to the removable secure processor, wherein the second channel is a broadcast channel;
in response to providing the second query, receiving a second response to the second query from the removable secure processor;
determining whether the second channel should be added to the hybrid EPG, wherein the determination is based at least on the second response; and adding the second channel to the hybrid EPG.

5. The method of claim 4, wherein the service information further comprises information about the second channel.

6. The method of claim 5, wherein the information about the second channel comprises at least one of:
a channel number;
a subscription identifier; and
a transponder Packet ID (PID).

7. The method of claim 1, wherein adding the first channel to the hybrid EPG further comprises:
determining whether a connection to the Internet is available; and
when the connection to the Internet is available, adding the first channel to the hybrid EPG.

8. The method of claim 7, wherein when the connection to the Internet is not available, the first channel is not added to the hybrid EPG.

9. The method of claim 7, further comprising:
when the connection to the Internet is not available, determining whether the first channel should be displayed in the hybrid EPG; and
when it is determined that the first channel should be displayed in the hybrid EPG, displaying the first channel in the hybrid EPG with an indication that the channel is currently unavailable.

10. The method of claim 1, further comprising displaying the first channel in the hybrid EPG with an indicator that the first channel is an OTT channel.

11. A set-top-box comprising:
at least one processor;
a removable secure processor; and
memory encoding computer executable instructions that, when executed by the at least one processor, perform a method comprising:
in response to a request for channel access, receiving service information at a removable secure processor, wherein the service information comprises data relating to a first channel, wherein the first channel is an over-the-top (OTT) channel;
sending, to the removable secure processor, a first query for the first channel;
using, by the removable secure processor, the service information to determine whether the removable secure processor has access to the first channel;
when it is determined that the removable secure processor does not have access to the first channel, adding the first channel to a hybrid EPG with a first indicator that the first channel is inaccessible;
displaying the hybrid EPG, wherein the hybrid EPG is generated using the service information.

12. The set-top-box of claim 11, wherein the removable secure processor receives service information from a satellite transmission.

13. The set-top-box of claim 12, wherein the service information is received prior to sending the first query.

14. The set-top-box of claim 12, wherein the service information comprises at least one of:
a channel number;
a subscription identifier;
a transponder Packet ID (PID);
an Internet Protocol (IP) address;
a uniform resource locator (URL); and
a port number.

15. The set-top-box of claim 11, wherein the method further comprises:
sending a second query for a second channel to the removable secure processor, wherein the second channel is a broadcast channel;
in response to providing the second query, receiving a second response to the second query from the removable secure processor; and
determining whether the second channel should be added to the hybrid EPG, wherein the determination is based at least on the second response; adding the second channel to the hybrid EPG.

16. The set-top-box of claim 11, wherein adding the first channel to the hybrid EPG further comprises:
determining whether a connection to the Internet is not available; and
when the connection to the Internet is available, adding the first channel to the hybrid EPG.

17. The set-top-box of claim 16, wherein adding the first channel to the hybrid EPG further comprises:
when the connection to the Internet is not available, determining whether the first channel should be displayed in the hybrid EPG; and
when it is determined that the first channel should be displayed in the hybrid EPG, displaying the first channel in the hybrid EPG with an indication that the channel is currently unavailable.

18. A computer storage device comprising:
at least one processor;
memory coupled to the at least one processor, the memory comprising computer executable instructions that, when executed by the at least one processor, performs a method comprising:
in response to a request for channel access, receiving, from a headend device, service information at a removable secure processor, wherein the service information comprises data relating to a first channel and a second channel, wherein the first channel is an over-the-top (OTT) channel and the second channel is not an OTT channel;
sending, to the removable secure processor, a first query for the first channel;
using, by the removable secure processor, the service information to determine whether the removable secure processor has access to the first channel and the second channel;
in response to determining that the removable secure processor does not have access to the first channel, adding the first channel to the hybrid EPG with a first indicator that the first channel is inaccessible;
in response to determining that the removable secure processor has access to the second channel, adding the second channel to the hybrid EPG; and
displaying the hybrid EPG.

19. The computer storage device of claim 18, one or more modules are further capable of being executed by the at least one processor to: receive service information comprising information about the first channel from a broadcast transmission.

20. The computer storage device of claim 19, wherein the service information is received prior to sending the first query.

\* \* \* \* \*